United States Patent
Hartman

(10) Patent No.: US 8,672,373 B1
(45) Date of Patent: Mar. 18, 2014

(54) METHOD AND APPARATUS FOR ROTATING SPATULA

(76) Inventor: Jeffrey Hartman, Mobile, AL (US)

( * ) Notice: Subject to any disclaimer, the term of this patent is extended or adjusted under 35 U.S.C. 154(b) by 0 days.

(21) Appl. No.: 13/068,580

(22) Filed: May 16, 2011

(51) Int. Cl.
*A47J 43/28* (2006.01)

(52) U.S. Cl.
USPC .................................................. 294/8

(58) Field of Classification Search
USPC ......... 294/7, 8, 28, 29, 32, 53.5; 30/123, 124, 30/324
See application file for complete search history.

(56) References Cited

U.S. PATENT DOCUMENTS

| | | | |
|---|---|---|---|
| 984,388 A * | 2/1911 | Osner ................................ | 294/8 |
| 2,643,907 A * | 6/1953 | Thomas ............................ | 294/7 |
| 3,761,120 A | 9/1973 | Binkert | |
| 4,095,832 A * | 6/1978 | Slinker ............................. | 294/8 |
| 4,844,525 A | 7/1989 | Tarlow et al. | |
| 5,634,679 A | 6/1997 | Hilderbrandt | |
| 6,193,289 B1 | 2/2001 | Brown | |
| 7,100,953 B1 | 9/2006 | Tarlow et al. | |
| 2005/0115077 A1* | 6/2005 | Rauber ............................ | 30/142 |
| 2005/0264017 A1* | 12/2005 | Rauber ............................ | 294/8 |
| 2006/0196055 A1 | 9/2006 | Barcala | |

* cited by examiner

*Primary Examiner* — Stephen Vu
(74) *Attorney, Agent, or Firm* — George L Williamson

(57) ABSTRACT

Disclosed is a method and apparatus for a handheld, pistol-grip type rotatable spatula having a pair of reciprocating spatulas on the front end which captures a food item, holding it in place between the pair of spatulas, and then rotating the food item approximately 180 degrees so that it will allow the user to easily turn a food item over, which item might be for example, on a cooking grill. The apparatus allows the user to turn or flip the food item over and gently lay the food item down without having to twist the wrist of the user. The apparatus allows a simple motion of the rear pistol grip type handle to be squeezed and compressed in the hand of a user so that the pair of spatulas holding the food come together holding the food therein which then allows the food to be rotated.

4 Claims, 3 Drawing Sheets

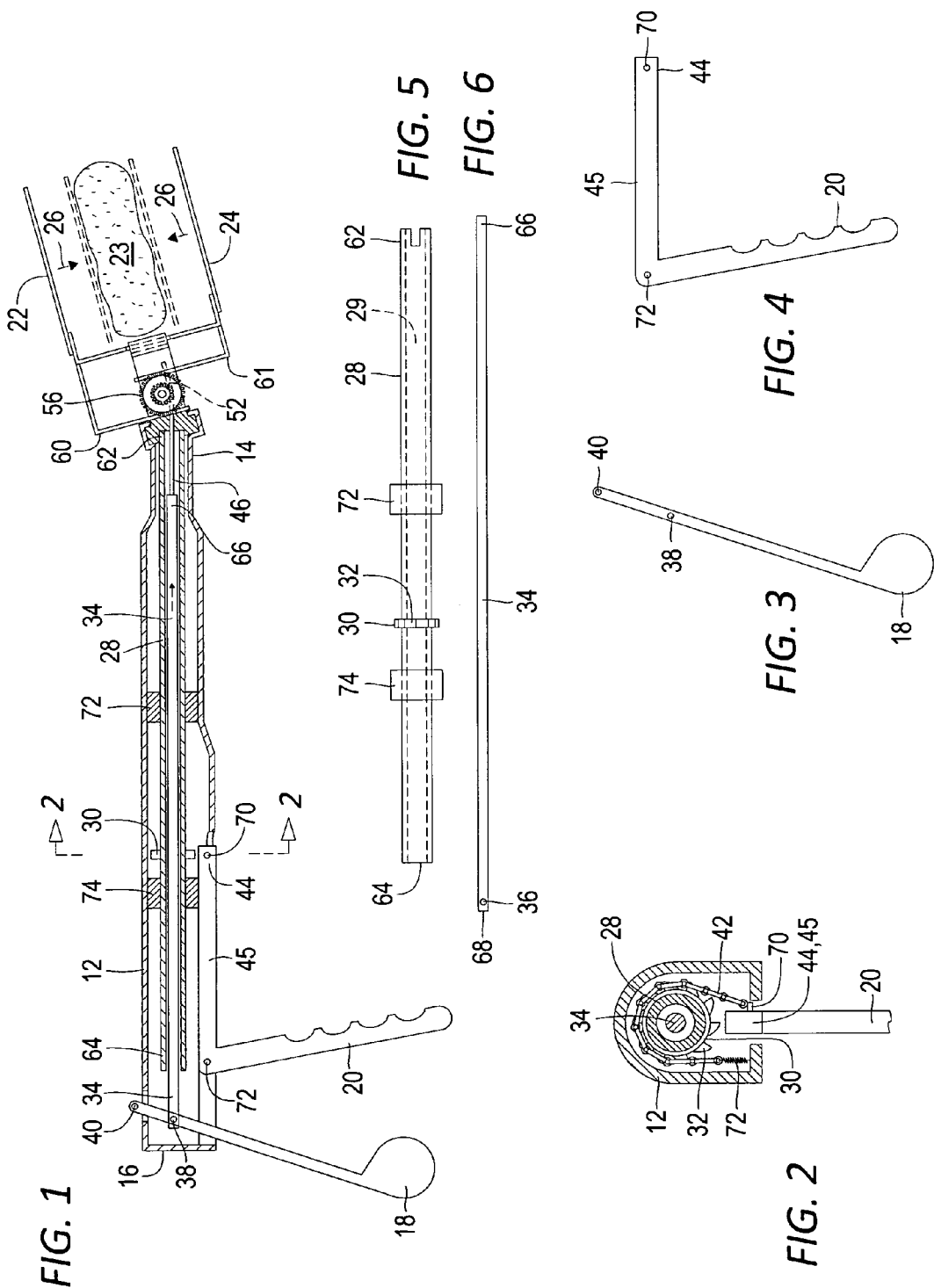

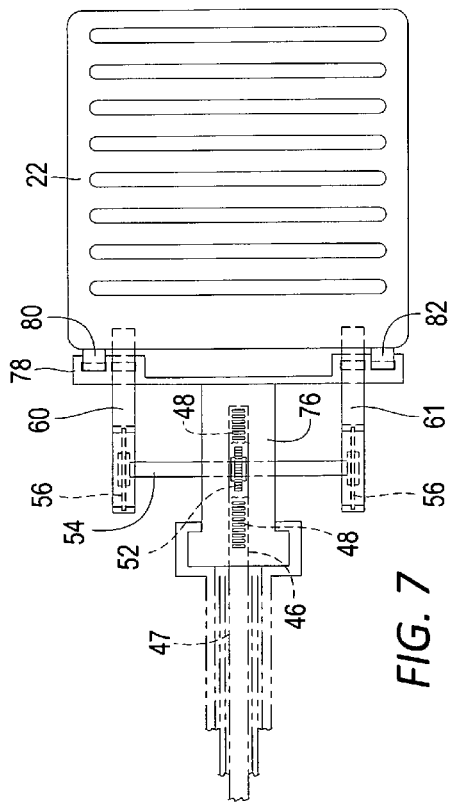
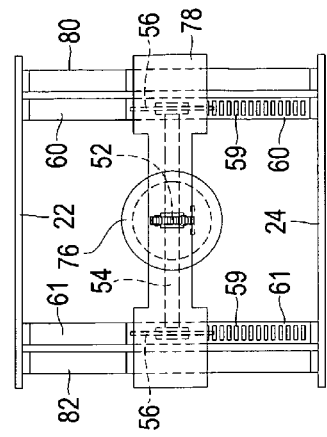
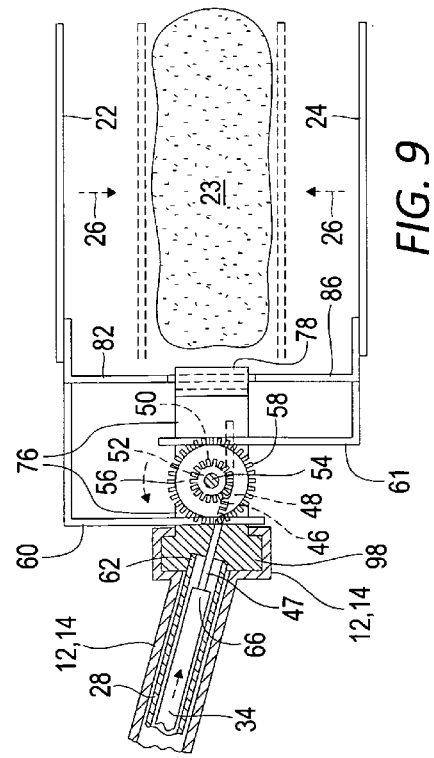
FIG. 7
FIG. 8
FIG. 9

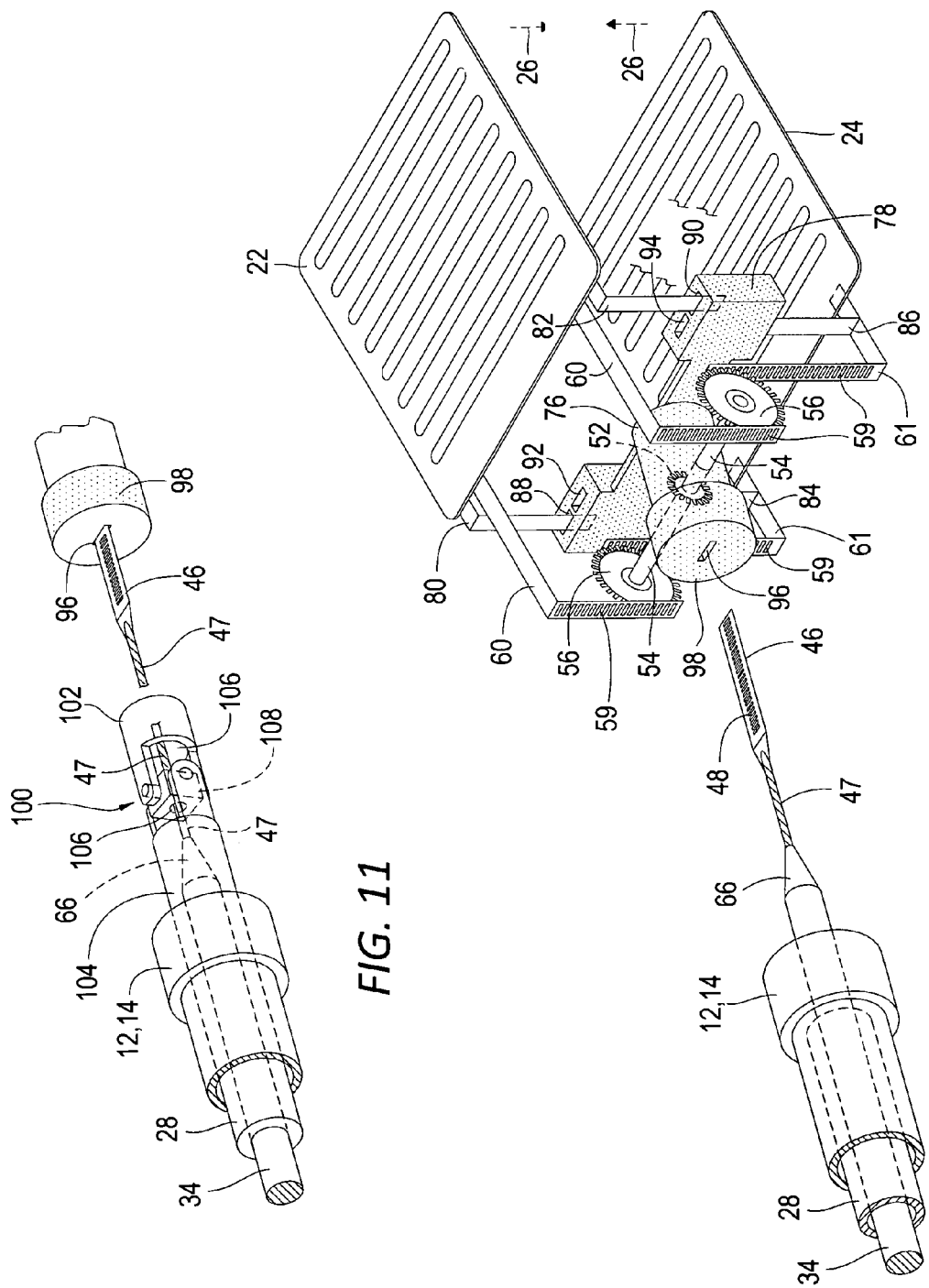

METHOD AND APPARATUS FOR ROTATING SPATULA

BACKGROUND OF THE INVENTION

1. Field of the Invention

The present invention relates generally to food handling appurtenances and, more particularly, is concerned with a method and apparatus for a rotating spatula.

2. Description of the Prior Art

Spatulas have been described in the prior art, however, none of the prior art devices disclose the unique features of the present invention.

In U.S. Pat. No. 7,100,953 dated Sep. 5, 2006, Tarlow, et al., disclosed a grip and flip barbeque utensil. In U.S. Pat. No. 3,761,120 dated Sep. 25, 1973, Binkert disclosed a food patty turning device. In U.S. Patent Application Publication 2006/0196055 dated Sep. 7, 2006, Barcala disclosed a self-clearing, grilling fork. In U.S. Pat. No. 6,193,289 dated Feb. 27, 2001, Brown disclosed a barbeque turner. In U.S. Pat. No. 5,634,679 dated Jun. 3, 1997, Hilderbrandt disclosed a rotatable spatula. In U.S. Pat. No. 4,844,525 dated Jul. 4, 1989, Tarlow, et al., disclosed a combination barbeque fork and spatula.

While these spatulas may be suitable for the purposes for which they were designed, they would not be as suitable for the purposes of the present invention as hereinafter described.

SUMMARY OF THE PRESENT INVENTION

The present invention discloses an apparatus and a method for a handheld, pistol-grip type rotatable spatula having a pair of reciprocating spatula portions on the front end which captures a food item thereinbetween, holding it in place between the pair of spatulas, and then rotating the food item approximately 180 degrees so that it will allow the user to easily turn a food item over, which item might be for example, on a cooking grill. The apparatus allows the user to turn or flip the food item over and gently lay the food item down without having to twist the wrist of the user. The apparatus allows a simple motion of the rear pistol grip type handle to be squeezed and compressed in the hand of a user so that the pair of spatulas holding the food come together holding the food therein which then allows the food to be rotated.

An object of the present invention is to allow the user to rotate a food item without twisting the wrist of the user by squeezing the pistol grip of the apparatus. Another object of the present invention is to prevent grease from popping out onto the user as the user tries to rotate the food item on a grill. A further object of the present invention is to provide a mechanism which can be easily and simply operated by a user. A further object of the present invention is to provide an invention which can be relatively inexpensively manufactured.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWINGS

In order that the invention may be more fully understood, it will now be described, by way of example, with reference to the accompanying drawings in which:

FIG. 1 is a cross sectional view of the present invention.

FIG. 2 is a cross sectional view of a portion of the present invention.

FIG. 3 is an elevation view of a portion of the present invention.

FIG. 4 is an elevation view of a portion of the present invention.

FIG. 5 is an elevation view of a portion of the present invention.

FIG. 6 is an elevation view of a portion of the present invention.

FIG. 7 is a plan view of a portion of the present invention.

FIG. 8 is a front elevation view of a portion of the present invention.

FIG. 9 is a side elevation view of a portion of the present invention.

FIG. 10 is a partially exploded, perspective view of a portion of the present invention.

FIG. 11 is a partially exploded, perspective view of a portion of the present invention.

LIST OF REFERENCE NUMERALS

With regard to reference numerals used, the following numbering is used throughout the drawings.

10 present invention
12 housing
14 front end
16 rear end
18 rear handle
20 front handle
22 first spatula portion
23 food item
24 second spatula portion
26 arrows
28 spin tube
29 bore
30 drive gear member
32 teeth
34 push rod
36 aperture
38 pivot pin
40 pivot pin
42 chain
44 front end
45 arm
46 strap
47 flexible shaft
48 apertures
50 teeth
52 central gear
54 axle
56 lateral gears
58 teeth
59 apertures
60 strap
61 strap
62 first end 64 second end
66 first end
68 second end
70 pivot pin
72 bushing
74 bushing
76 connecting member
78 guide member
80 guide arm
82 guide arm
84 guide arm
86 guide arm
88 aperture
90 aperture
92 aperture
94 aperture
96 bore
98 end portion
100 universal joint
102 first end
104 second end
106 bore
108 box

DETAILED DESCRIPTION OF THE PREFERRED EMBODIMENT

The following discussion describes in detail at least one embodiment of the present invention. This discussion should not be construed, however, as limiting the present invention to the particular embodiments described herein since practitioners skilled in the art will recognize numerous other embodiments as well. For a definition of the complete scope of the invention the reader is directed to the appended claims. FIGS. 1 through 10 illustrate the present invention wherein a liquid rotatable spatula is disclosed.

Turning to FIGS. 1-10 therein is disclosed the present invention 10 having a housing 12 having a first front end portion 14 and a second rear end portion 16 wherein a rear handle 18 and a front handle 20 are disposed proximate the rear of the housing 12, along with a first spatula portion 22 and a second spatula portion 24 being disposed so as to be angularly offset from the central axis of the housing on the front end of the housing so that a food item 23 can be captured between the reciprocating grills which movement is shown by arrows 26. A spin tube 28 is mounted in housing 12 for being rotatable using front and rear bushings 72, 74 or the like. Spin tube 28 having bore 29 therein is shown having first and second end portions 62, 64 generally corresponding to ends 14, 16 so that along with a drive gear member 30 having teeth 32 thereon generally forming a sprocket which allows the spin tube 28 to be rotated by chain 42 when the front handle 20 is squeezed rearwardly as would occur when the hand of a user is squeezed. The spin tube 28 having the drive gear 30 thereon is connected to a chain-like member 42 made of multiple interconnecting chain link or the like for receiving teeth 32 therein, which chain connects to an end portion 44 of an arm 45 of the front handle 20 so that when the handle 20 is squeezed and compressed by the hand of a user the front end 44 pulls downwardly on the chain 42 so that the spin tube 28 is rotated clockwise. Chain 42 connects to end 44 of handle 20 at first pivot pin 70 and handle 20 has a second pivot pin 72 connecting to housing 12. Spring 72 biases chain 42 and gear 30 counterclockwise and thereby the front end 44 of the handle 20 upwardly toward the unsqueezed position. Also shown is a push rod 34 disposed internal spin tube 28, having first and second end portions 66, 68, generally corresponding to end 14, 16, with an aperture 36 in the rear end so that the mating pivot pin 38 on the rear handle 18 mates with aperture 36 so that the push rod 34 moves forward (or rearward) in response to the rear handle 18 being either squeezed or released due to the fact that the rear handle is pivotable about a pivot member 40 on its distal end which is fixed to the housing 12. The front end 66 of push rod 34 has a forwardly extending strap 46 attached thereto which strap has a plurality of holes 48 therein which holes are designed to cooperate with and mate with the teeth 50 of a co-aligned central gear 52 mounted onto an axle 54 having first and second lateral gears 56 having teeth 58 thereon which lateral gears 56 cooperate with holes 59 placed in straps 60, 61 which straps are connected to the upper 22 and lower 24 spatulas, respectively, so that when the gears 56 turn on the axle 54 the straps 60, 61 are pulled, i.e., move in response thereto, so as to bring the spatulas 22, 24 together. Turning to FIG. 9, the front end 62 of spin tube 28 is configured to be joined to a rear portion of connecting member 76 which member has a front portion being a guide member 78 configured to attach to receive guide arms 80, 82, 84, 86 on the rear portion of grills 72, 74. FIG. 11 shows a universal joint 100 joining spin tube 28 and end portion 98 having a first and second end 102, 104 having a bore 106 extending therethrough and having box 108 so that portions of the push rod 34 can extend therethrough the first and the second end. U-joint 100 may be useful if the angle of the spatulas 22, 24 relative to the housing 12 is too great so as to make it difficult to turn the spin tube 28. Flex shaft 47 portion is also shown as an alternative design if it is necessary for the push rod 34 to be more flexible in order to accommodate the angle of the spatulas 22, 24 relative to the housing 12.

It can be seen that downwardly disposed guide arms 80, 82 are attached to the rear of spatula 22 extending through apertures 88, 90 and upwardly disposed guide arms 84, 86 are attached to the rear of spatula 24 and extend through apertures 92, 94 so that the spatulas 22, 24 are maintained in cooperating alignment. Strap 46 extends through bore 96 of connecting member 76. Flexible strap 46 is connected to first end 66 of push rod 34. An end portion 98 of connecting member 76 is rotatably mounted in end portion 14 of housing 12.

Thus, it can be seen, the spatulas, 22, 24 pull toward each other when the rear handle 18 is squeezed forwardly and compressed. Furthermore, it can be seen that the spatulas 22, 24 are rotated when the spin tube 28 is turned as handle 20 is squeezed rearwardly and compressed.

I claim:

1. A method for turning a food item, comprising the steps of:
   a) providing a housing having first and second end portions and upper and lower portions, the housing being held in the hand of a user;
   b) providing a spin tube having first and second end portions being rotatably disposed in the housing, the spin tube having a bore therein;
   c) providing a push rod having first and second end portions being slidably disposed in the bore of the spin tube;
   d) providing a front handle on the housing, the front handle being movable by being squeezed in the hand of the user;
   e) whereby the spin tube rotates in response to the front handle being squeezed in the hand of the user;
   f) providing a rear handle on the housing, the rear handle being movable by being squeezed in the hand of the user;
   g) connecting the rear handle to the push rod so that the push rod slides in the spin tube in response to the rear handle being squeezed in the hand of the user;
   h) providing first and second reciprocating spatula portions on the first end portion of the housing wherein the first and second spatula portions reciprocate toward and away from each other in response to the rear handle being squeezed in the hand of a user, wherein the food item is held between the first and second spatula portions;
i) placing the food item on one of the spatula portions and capturing the food item between said first and second spatula portions by squeezing said rear handle to reciprocate the first and second spatula portions toward each other;
j) rotating the first and second spatula portions with said food item captured therebetween by squeezing said front handle; and
k) separating said first and second spatula portions by releasing said rear handle for releasing said food item in a turned position.

2. The method of claim 1, wherein the first and second reciprocating spatula portions are angularly disposed relative to a longitudinal axis of the housing.

3. A method for turning a food item, comprising the steps of:
a) providing a housing having first and second end portions and upper and lower portions, the housing being held in the hand of a user;
b) providing a spin tube having first and second end portions being rotatably disposed in the housing, the spin tube having a bore therein;
c) providing a push rod having first and second end portions being slidably disposed in the bore of the spin tube;
d) providing a front handle on the housing, the front handle being movable by being squeezed in the hand of the user;
e) rotating the spin tube in response to the front handle being squeezed in the hand of the user;
f) providing a rear handle on the housing, the rear handle being movable by being squeezed in the hand of the user;
g) connecting the rear handle to the push rod so that the push rod slides in the spin tube in response to the rear handle being squeezed in the hand of the user;
h) providing first and second reciprocating spatula portions on the first end portion of the housing wherein the first and second spatula portions reciprocate toward and away from each other in response to the rear handle being squeezed in the hand of a user, wherein the food item is held between the first and second spatula portions;
i) reciprocating the first and second spatula portions so that the first and second spatula portions move toward and away from each other in response to the rear handle being squeezed in the hand of a user;
j) joining the first and second spatula portions to the spin tube using a connecting member so that the first and second spatula portions rotate on the spin tube, wherein the food item is rotated in the first and second spatula portions when the spin tube is rotated, said spin tube being rotated by providing a gear drive member circumferentially disposed about the spin tube, the gear drive member having a plurality of teeth disposed thereon, providing a chain having a plurality of links, the links cooperating with the teeth and joining an end of the chain to the front handle, wherein the spin tube rotates in response to the front handle being squeezed in the hand of the user.

4. A method for turning a food item, comprising the steps of:
a) providing a housing having first and second end portions and upper and lower portions, the housing being held in the hand of a user;
b) providing a spin tube having first and second end portions being rotatably disposed in the housing, the spin tube having a bore therein;
c) providing a push rod having first and second end portions being slidably disposed in the bore of the spin tube;
d) providing a front handle on the housing, the front handle being movable by being squeezed in the hand of the user;
e) rotating the spin tube in response to the front handle being squeezed in the hand of the user;
f) providing a rear handle on the housing, the rear handle being movable by being squeezed in the hand of the user;
g) connecting the rear handle to the push rod so that the push rod slides in the spin tube in response to the rear handle being squeezed in the hand of the user;
h) providing first and second reciprocating spatula portions on the first end portion of the housing wherein the first and second spatula portions reciprocate toward and away from each other in response to the rear handle being squeezed in the hand of a user, wherein the food item is held between the first and second spatula portions;
i) reciprocating the first and second spatula portions so that the first and second spatula portions move toward and away from each other in response to the rear handle being squeezed in the hand of a user by providing a central gear between the first and second spatula portions on an axle, the central gear having a plurality of teeth disposed thereon, providing a first strap on the first end portion of the push rod, the first strap having a plurality of apertures so that the apertures cooperate with the teeth of the central gear so that the central gear turns in response to the first strap being moved, providing a second strap having a plurality of apertures therein on the first spatula portion and a third strap having a plurality of apertures therein on the second spatula portion, and providing a first and second lateral gear on the axle, the first and second lateral gears each having a plurality of teeth disposed thereon so that the teeth of the first and second lateral gears cooperate with the apertures of the second and third straps, wherein the first and second spatula portions reciprocate in response to the rear handle being squeezed in the hand of the user; and,
j) joining the first and second spatula portions to the spin tube using a connecting member so that the first and second spatula portions rotate on the spin tube, wherein the food item is rotated in the first and second spatula portions when the spin tube is rotated.

* * * * *